No. 725,938. PATENTED APR. 21, 1903.
F. P. CROCKETT & O. P. JOHNSON.
TROLLEY WHEEL.
APPLICATION FILED JAN. 23, 1899.
NO MODEL.
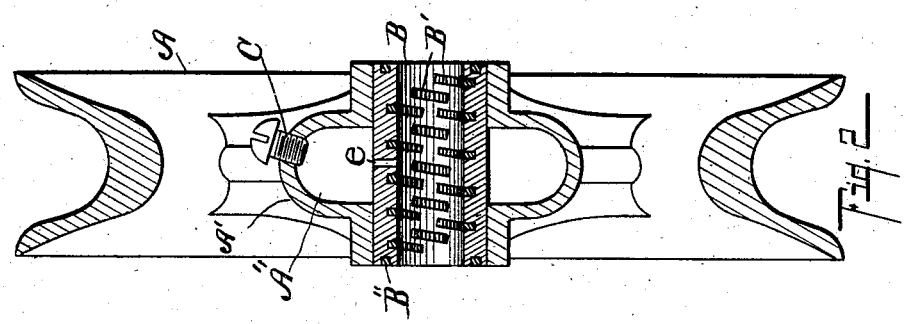
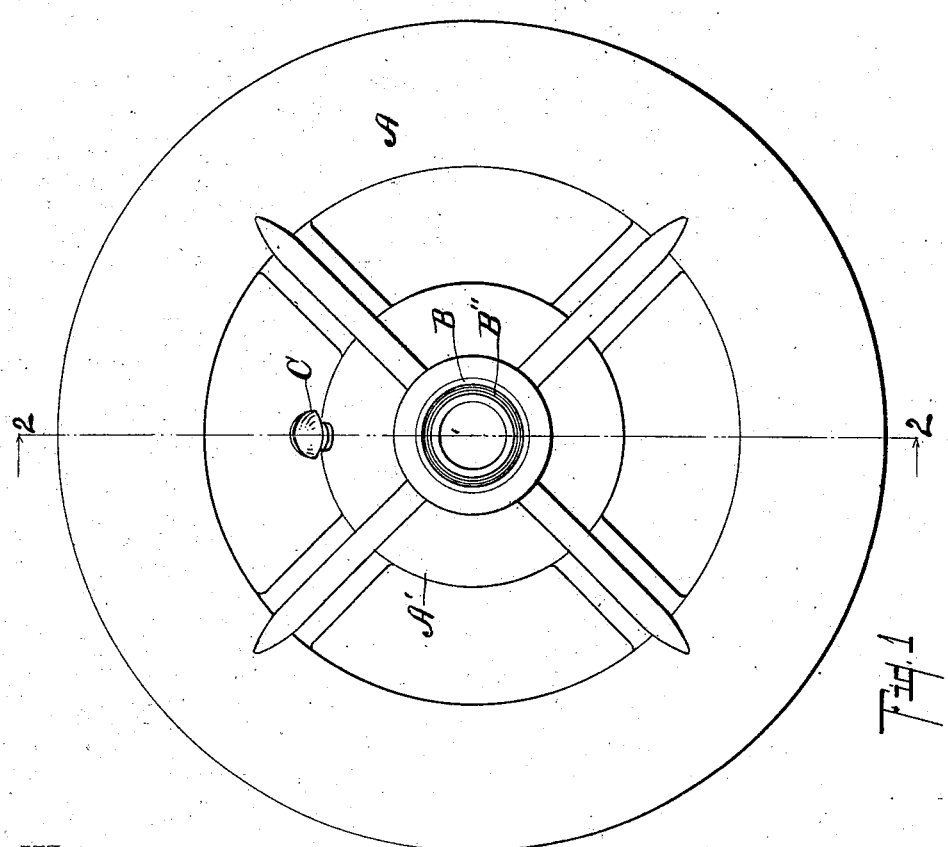
Witnesses:
Otis A. Earl.
Cassa M. Chappell
Inventors
O. Prentice Johnson & Fred P. Crockett
By Fred L. Chappell
Att'y.

UNITED STATES PATENT OFFICE.

FRED P. CROCKETT AND OSRO PRENTISS JOHNSON, OF KALAMAZOO, MICHIGAN, ASSIGNORS TO THE STAR BRASS WORKS, OF KALAMAZOO, MICHIGAN.

TROLLEY-WHEEL.

SPECIFICATION forming part of Letters Patent No. 725,938, dated April 21, 1903.

Application filed January 23, 1899. Serial No. 703,200. (No model.)

*To all whom it may concern:*

Be it known that we, FRED P. CROCKETT and OSRO PRENTISS JOHNSON, citizens of the United States, residing at the city of Kalamazoo, in the county of Kalamazoo and State of Michigan, have invented certain new and useful Improvements in Trolley-Wheels, of which the following is a specification.

This invention relates to improvements in trolley-wheels and means of lubricating the same.

Heretofore it has been attempted to lubricate a trolley-wheel by some means, as delivering oil to the axle continuously or by providing a bushing having pockets within which are supported quantities of graphite or plumbago. Where the oil alone is used, the supply must be quite liberal, and to carry it in connection with the wheel itself is very awkward and unsatisfactory. Where the bushings with graphite-receptacles alone are used, it is necessary to renew the same at frequent intervals during the life of the remainder of the wheel, as they will be worn out much in advance of other parts of the wheel. This invention makes use of both of these devices effectively applied, it having been discovered that a very small quantity of oil in connection with the bushings containing the packages of graphite is very effective and that by this method the bushing will be perfectly lubricated and will last as long as the trolley-wheel itself.

The objects of this invention are therefore to provide means whereby a graphite-bushing is utilized in connection with a receptacle for oil which shall deliver a small quantity of oil to the bushing to successfully lubricate the same.

Minor objects of the structure will appear in the detailed description to follow.

We accomplish these objects of our invention by the devices and means illustrated in the accompanying drawings, in which—

Figure 1 is a side view of the trolley-wheel, showing the relations of the various parts. Fig. 2 is a vertical transverse detail sectional view through the same, showing the internal construction thereof.

In the drawings similar letters of reference refer to similar parts throughout both views.

A represents the trolley-wheel, which is provided with a suitable hub, which is enlarged at A' and made hollow, so that a receptacle A'' is formed therein, which preferably is annular and extends entirely around the hub. An opening is provided for the introduction of oil, which is closed by the screw-plug C, and bushing B is driven tightly into the hub and completes the formation of the receptacle A''. Through one side of the bushing, near its center, a small perforation e is made to allow the escape of oil from the receptacle into the bearings. The bushing is made up of steel or other suitable metals, in which are formed pockets filled with graphite B'. An annular groove is formed at each end and is filled with graphite, as at B''. This affords bearings for the contact-springs of the trolley fork or harp.

In use the receptacle A'' is filled with oil, and it escapes very gradually through the perforation e, and a very small quantity of oil is thus distributed over the bearing-surface, which is all that is necessary to produce perfect lubrication when the bushing is provided with the sections of graphite.

We desire to state that the particular arrangement and manner in which the graphite is placed in the bushing is not material to our invention as long as there is a bushing adapted to receive and hold the graphite in such a position that it will form part of the bearing-surface and that this in connection with the means of delivering a very small quantity of oil is all that is necessary to produce the successful trolley-wheel. The centrifugal force carries the oil to the periphery of the oil-receptacle when the wheel is in motion, so that the oil is delivered to the bearings only when the wheel is at rest, thus preventing a waste of oil.

Having thus described our invention, what we claim as new, and desire to secure by Letters Patent, is—

A trolley-wheel with a suitable hub containing a receptacle therein and bushing inserted tightly into said hub forming a sealed chamber which bushing contains receptacles supporting graphite in position to form part of the bearing-surface; the said bushing containing a single perforation to deliver oil from the oil-receptacle thereto, coacting for the purpose specified.

In witness whereof we have hereunto set our hands and seals in the presence of two witnesses.

FRED P. CROCKETT. [L. S.]
O. PRENTISS JOHNSON. [L. S.]

Witnesses:
LELA M. BROWN,
OTIS A. EARL.